(12) United States Patent
Hagiwara et al.

(10) Patent No.: US 9,260,306 B2
(45) Date of Patent: Feb. 16, 2016

(54) HYDROGEN FLUORIDE PURIFICATION METHOD

(75) Inventors: Rika Hagiwara, Kyoto (JP); Kazuhiko Matsumoto, Kyoto (JP)

(73) Assignee: KYOTO UNIVERSITY, Kyoto-Shi (JP)

( * ) Notice: Subject to any disclaimer, the term of this patent is extended or adjusted under 35 U.S.C. 154(b) by 1187 days.

(21) Appl. No.: 13/131,703

(22) PCT Filed: Nov. 25, 2009

(86) PCT No.: PCT/JP2009/069836
§ 371 (c)(1),
(2), (4) Date: Aug. 15, 2011

(87) PCT Pub. No.: WO2010/061838
PCT Pub. Date: Jun. 3, 2010

(65) Prior Publication Data
US 2011/0286911 A1 Nov. 24, 2011

(30) Foreign Application Priority Data

Nov. 28, 2008 (JP) .................... 2008-304711

(51) Int. Cl.
*C01B 7/19* (2006.01)
(52) U.S. Cl.
CPC ....................... *C01B 7/195* (2013.01)
(58) Field of Classification Search
CPC ............................................ C01B 7/195
USPC ................... 423/488, 485, 489, 491
See application file for complete search history.

(56) References Cited

U.S. PATENT DOCUMENTS

| 4,668,497 A | 5/1987 | Miki |
| 5,108,559 A * | 4/1992 | Motz et al. ............... 205/687 |
| 5,362,469 A | 11/1994 | Seseke-Koyro et al. |
| 6,346,227 B1 * | 2/2002 | Lailach .................. 423/484 |
| 6,919,484 B2 * | 7/2005 | Dolbier et al. ............. 568/74 |

(Continued)

FOREIGN PATENT DOCUMENTS

| CA | 2115135 | 8/1994 |
| EP | 0 160 737 A2 | 11/1985 |

(Continued)

OTHER PUBLICATIONS

English translation of the International Preliminary Report on Patentability (Chapter I of the PCT), Forms PCT/IB/373 and PCT/ISA/237.

(Continued)

*Primary Examiner* — Ngoc-Yen Nguyen
(74) *Attorney, Agent, or Firm* — Birch, Stewart, Kolasch & Birch, LLP

(57) ABSTRACT

A novel method for purifying hydrogen fluoride, capable of efficiently reducing the content of arsenic in hydrogen fluoride. The method includes the steps of (a) bringing a crude hydrogen fluoride containing arsenic trifluoride into contact with an oxidizing agent of a metal fluoride in a liquid state in a reactor to obtain a reaction mixture, wherein arsenic pentafluoride is formed by oxidizing arsenic trifluoride with the oxidizing agent of the metal fluoride through a liquid-liquid reaction; and (b) separating purified hydrogen fluoride from the reaction mixture by a separator, the thus obtained purified hydrogen fluoride having a lower content of arsenic than that of the crude hydrogen fluoride.

13 Claims, 2 Drawing Sheets

(56) References Cited

U.S. PATENT DOCUMENTS

| | | | |
|---|---|---|---|
| 8,513,458 B2 * | 8/2013 | Quan et al. | 562/851 |
| 2002/0001553 A1 * | 1/2002 | Bulan et al. | 423/210 |

FOREIGN PATENT DOCUMENTS

| | | |
|---|---|---|
| EP | 0 426 286 A1 | 5/1991 |
| EP | 0 426 344 A1 | 5/1991 |
| JP | 43-15889 B | 7/1968 |
| JP | 44-14088 B | 6/1969 |
| JP | 47/16407 B | 5/1972 |
| JP | 60-235701 A | 11/1985 |
| JP | 61-151002 A | 7/1986 |
| JP | 2-502277 A | 7/1990 |
| JP | 3-501965 A | 5/1991 |
| JP | 3-146401 A | 6/1991 |
| JP | 3-205304 A | 9/1991 |
| JP | 5-221603 A | 8/1993 |
| JP | 8-283408 A | 9/1994 |
| JP | 7-504149 A | 5/1995 |
| JP | 11-507001 A | 6/1999 |
| WO | WO 88/08139 A1 | 8/1988 |
| WO | WO 90/00521 A | 1/1990 |
| WO | WO 93/12033 A1 | 8/1993 |
| WO | WO 96/41687 | 12/1996 |
| WO | WO 2007037468 A1 * | 4/2007 |

OTHER PUBLICATIONS

Boris Zemva et al.; Spontaneous Oxidation of Xenon to Xe(II) by Cationic Ag(II) in Anhydrous Hydrogen Fluoride Solutions; Journal of the American Chemical Society, 1990, 112, 4846-4849.

* cited by examiner

HYDROGEN FLUORIDE PURIFICATION METHOD

TECHNICAL FIELD

The present invention relates to a method for purifying hydrogen fluoride, and more particularly to a method for reducing the content of arsenic in hydrogen fluoride. The present invention also relates to a method for purifying hydrogen fluoride using such a purification method.

BACKGROUND ART

Hydrogen fluoride is industrially produced by reacting fluorite (containing $CaF_2$ as a main component) with sulfuric acid ($H_2SO_4$) under heating ($CaF_2+H_2SO_4 \rightarrow 2HF\uparrow+CaSO_4$), and collecting the reaction mixture, which contains thus generated hydrogen fluoride (HF), in the form of a gas, followed by distillation.

A rude ore of fluorite may contain, in addition to calcium fluoride ($CaF_2$) as a main component, impurities such as silicon dioxide ($SiO_2$), calcium carbonate ($CaCO_3$) and arsenic (As). Usually, a commercially available fluorite has already been purified, and those which are now used in the industrial production of hydrogen fluoride contain usually about 1% by mass of impurities such as silicon dioxide ($SiO_2$), calcium carbonate ($CaCO_3$) and arsenic (As). When hydrogen fluoride is produced by using such fluorite, silicon dioxide reacts with hydrogen fluoride to form silicon fluoride ($SiF_4$). Silicon fluoride can be removed comparatively easily by distillation (silicon fluoride and hydrogen fluoride can be separated from each other by distillation, the former as a gaseous substance and the latter as a condensate). Calcium carbonate reacts with sulfuric acid to form calcium sulfate ($CaSO_4$), carbon dioxide ($CO_2$) and water ($H_2O$). Calcium sulfate remains in a reacting furnace and is not mixed in hydrogen fluoride collected in the form of a gaseous substance, and water can be easily removed by simple distillation and also carbon dioxide can be removed comparatively easily by distillation. Therefore, both of them are not mixed in hydrogen fluoride. In contrast, arsenic, what kind of form which takes in fluorite is not clearly understood, reacts with hydrogen fluoride to form arsenic trifluoride ($AsF_3$). Since a difference in a boiling point between arsenic trifluoride and hydrogen fluoride is small (a boiling point of HF is 19.5° C., a boiling point of $AsF_3$ is 63° C.), it is difficult to completely remove arsenic trifluoride by distillation, and therefore arsenic trifluoride is mixed in hydrogen fluoride as a product.

Hydrogen fluoride is utilized as a starting substance for chlorofluorocarbon gases and fluororesins, which are fluorine chemical products, and is also utilized as an etching agent in the production of a semiconductor. When arsenic is mixed in hydrogen fluoride, there are problems that in the production of a chlorofluorocarbon gas, a catalyst can be poisoned, and that in the production of a semiconductor, arsenic can diffuse into a semiconductor device thereby exerting an adverse influence on operation of the device. Therefore, there is a demand for a high-purity hydrogen fluoride which contains as little arsenic as possible. In the process of producing a high-purity hydrogen fluoride in an industrial scale, a high-quality fluorite having an originally low content of arsenic is used as a reaction raw material, while a low-quality fluorite having a high content of arsenic is not used at present.

CITATION LIST

Patent Literature

Patent Literature 1: JP 47-16407 B
Patent Literature 2: JP 61-151002 A
Patent Literature 3: JP 2-502277 A
Patent Literature 4: JP 3-146401 A
Patent Literature 5: JP 3-205304 A
Patent Literature 6: JP 6-263406 A
Patent Literature 7: JP 7-504149 A

SUMMARY OF INVENTION

Technical Problem

However, a high-quality fluorite is unevenly distributed, and almost all of the high-quality fluorites is produced in China, presently. Therefore, exhaustion of resource is concerned. Further, due to export restraint of the Chinese Government, the permitted export quantity of the high-quality fluorite has decreased, which has caused an increase in its price.

Under these circumstances, there has been an increase in demand for utilization of a low-quality fluorite in an industrial scale in place of the high-quality fluorite. In order to obtain a high-purity hydrogen fluoride having a low content of arsenic by using the low-quality fluorite, it is possible to take either a measure in which the low-quality fluorite is purified in advance thereby reducing the content of arsenic thereof and then hydrogen fluoride is obtained using the purified fluorite, or a measure in which a crude hydrogen fluoride is obtained using the low-quality fluorite and then the crude hydrogen fluoride is purified thereby reducing the content of arsenic thereof. However, since a conventional purification method of fluorite has not sufficient arsenic removing ability, it is difficult to take the former measure. Therefore, in order to take the latter measure, it has been desired to develop a method for purifying hydrogen fluoride capable of efficiently reducing the content of arsenic in hydrogen fluoride.

There have been proposed, as the method for purifying hydrogen fluoride capable of reducing the content of arsenic in hydrogen fluoride, a method in which hydrofluoric acid is treated with potassium permanganate ($KMnO_4$) and/or potassium dichromate ($K_2Cr_2O_7$) and then distillation is carried out in the presence of an inorganic salt of a divalent iron (Patent Literature 1), a method in which a fluorine gas is added to hydrofluoric acid and then distillation is carried out (Patent Literature 2), a method in which an anhydrous hydrogen fluoride is brought into contact with hydrogen peroxide in the presence of a catalyst and then distillation is carried out (Patent Literature 3), methods in which an anhydrous hydrogen fluoride is reacted with a sulfur compound (for example, $H_2S$) or an iodine compound (for example, HI) to form a precipitate of arsenic sulfide or arsenic iodide (Patent Literatures 4 and 5), methods in which hydrofluoric acid is subjected to an electrolytic operation (Patent Literatures 6 and 7) and the like. However, these methods have problems that a reaction requires a long time (Patent Literatures 1, 2 and 3), a large amount of waste is generated (Patent Literature 1), it is difficult to remove a fluorine gas (Patent Literature 2), it is impossible to sufficiently decrease the content of arsenic (Patent Literatures 2, 4 and 5), and an electrolytic membrane has insufficient durability (Patent Literatures 6 and 7).

An object of the present invention is to provide a novel method for purifying hydrogen fluoride, capable of at least partially alleviating the aforementioned problems in the prior art, and efficiently reducing the content of arsenic in hydrogen fluoride.

Solution to Problem

Since arsenic existing in hydrogen fluoride takes a form of arsenic trifluoride ($AsF_3$), the present inventors have organized and studied methods of separating arsenic trifluoride from hydrogen fluoride.

As described above, since a difference in a boiling point between arsenic trifluoride and hydrogen fluoride is small (a boiling point of HF is 19.5° C., a boiling point of AsF$_3$ is 63° C.) and also it is difficult to form a complex salt together with HF (thus, it is difficult to undergo ionization in HF), it is difficult to remove arsenic trifluoride from hydrogen fluoride only by simple distillation.

The basic principle of the widely used methods among conventional methods for purifying hydrogen fluorides is that arsenic trifluoride (AsF$_3$) is converted into arsenic pentafluoride (AsF$_5$) and then arsenic pentafluoride is separated from hydrogen fluoride by distillation (see, for example, Patent Literatures 1-3). This utilizes the fact that, whereas arsenic trifluoride (AsF$_3$) is volatile, arsenic pentafluoride (AsF$_5$) forms complex salt together with HF and undergoes ionization in HF (likely to remain in a liquid phase).

In order to convert arsenic trifluoride into arsenic pentafluoride, oxidation of arsenic trifluoride with solid oxidizing agents such as potassium permanganate (KMnO$_4$) and/or potassium dichromate (K$_2$Cr$_2$O$_7$) is utilized (see Patent Literature 1). However, there is a problem that the reaction rate is low because of a solid-liquid reaction, and also there is a disadvantage that it requires dispose of MnO$_2$ and Cr$_2$O$_3$ as wastes, which are by-produced in the oxidation reaction.

In order to convert arsenic trifluoride into arsenic pentafluoride, it is the most excellent way to react arsenic trifluoride with a fluorine (F$_2$) gas (see, for example, Patent Literature 2) in respect of elimination of by-products. However, there is a problem that the reaction rate is comparatively low because of a gas-liquid reaction, and also there is a fundamental problem that it is difficult to remove an excess F$_2$ gas from hydrogen fluoride in respect of purification of hydrogen fluoride.

Then, the present inventors focused on fluorine. Fluorine is an element which has the smallest ionic radius among halogens and the largest electronegativity among all elements, and is able to form compounds with many other elements at different oxidation states, and especially able to form a compound in a particularly high oxidation state (a compound containing more fluorine elements). Particularly, since a metal fluoride easily varies the oxidation state and also is able to take various forms (so that it can be dissolved in hydrogen fluoride), it is considered that the metal fluoride is suited for use as an oxidizing agent capable of converting arsenic trifluoride into arsenic pentafluoride so as to purify hydrogen fluoride.

The present inventors have intensively studied based on the above viewpoint, and thus the present invention has been completed.

According to one aspect of the present invention, there is provided a method for purifying hydrogen fluoride, which comprises the steps of:

(a) bringing a crude hydrogen fluoride containing arsenic trifluoride into contact with an oxidizing agent of a metal fluoride in a liquid state to obtain a reaction mixture wherein arsenic pentafluoride is formed by oxidizing arsenic trifluoride with the oxidizing agent of the metal fluoride through a liquid-liquid reaction, and (b) separating purified hydrogen fluoride from the reaction mixture, the thus obtained purified hydrogen fluoride having a lower content of arsenic than that of the crude hydrogen fluoride.

According to the method for purifying hydrogen fluoride of the present invention, at least the aforementioned problems in the prior art can be partially alleviated and the content of arsenic in hydrogen fluoride can be efficiently decreased.

More particularly, there is a remarkable advantage that the use of an oxidizing agent of a metal fluoride in the step (a) of the present invention can realize an oxidation reaction converting arsenic trifluoride into arsenic pentafluoride in a liquid-liquid reaction, and the reaction rate thereof is higher than those of a solid-liquid reaction and a gas-liquid reaction. Therefore, while not intending to limit the present invention, for example, the step (a), preferably the entirety of the steps (a) and (b) can also be continuously carried out. The reaction mixture obtained by the step (a) of the present invention may contain, in addition to hydrogen fluoride, a metal fluoride (an oxidizing agent of a metal fluoride and a reduced metal fluoride derived therefrom) and arsenic pentafluoride. In the step (b), the metal fluoride and arsenic pentafluoride can be easily separated and removed, for example, by a distillation or rectification operation, and thus a purified hydrogen fluoride can be obtained.

The oxidizing agent of the metal fluoride may be those comprising a metal fluoride which is able to oxidize arsenic trifluoride into arsenic pentafluoride in hydrogen fluoride. Although such metal fluoride can be selected by a trial-and-error procedure, it can be taken into account as one selection indicator that an oxidation-reduction potential of the following reaction for the metal fluoride:

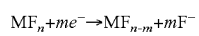
$$MF_n + me^- \rightarrow MF_{n-m} + mF^-$$

wherein M represents a metal atom, n represents an integer of 2 or more, m represents an integer of 1 or more, and n and n-m represent an oxidation number which can be possessed by a metal atom M
is higher than an oxidation-reduction potential of the following reaction:

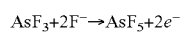
$$AsF_3 + 2F^- \rightarrow AsF_5 + 2e^-$$

Herein, the oxidation-reduction potential is an oxidation-reduction potential in HF.

Specifically, it is possible to use, as the oxidizing agent of the metal fluoride, fluorides of metals such as titanium, vanadium, chromium, manganese, iron, cobalt, nickel, copper, zinc, zirconium, niobium, molybdenum, ruthenium, rhodium, palladium, silver, cadmium, hafnium, tantalum, tungsten, rhenium, osmium, iridium, platinum, gold, mercury and bismuth, wherein the fluorides of metals comprises a metal fluoride in a higher oxidation state than a stable state.

More specifically, the metal fluoride which can be utilized as the oxidizing agent comprises, for example, at least one kind of metal fluoride selected from the group consisting of the following formulas:

$$M^{II}F_2,$$

$$M^{III}F_3,$$

$$M^{IV}F_4,$$

and

$$M^{V}F_5$$

wherein
$M^{II}$=Ag,
$M^{III}$=Ti, V, Cr, Mn, Fe, Co, Ni, Cu, Zr, Mo, Ru, Rh, Pd, Ag, Ir, or Au,
$M^{IV}$=Ti, V, Cr, Mn, Co, Ni, Zr, Nb, Mo, Ru, Rh, Pd, Ag, Cd, Hf, W, Re, Os, Ir, Pt, or Hg, and
$M^{V}$=Nb, Mo, Ru, Rh, Ta, W, Re, Os, Ir, Pt, Au, or Bi.

Among these, those having high solubility in hydrogen fluoride are preferable.

The oxidizing agent of the metal fluoride may contain such a metal fluoride alone, or may contain any two or more kinds of them in combination.

The aforementioned metal fluoride per se is often insoluble in hydrogen fluoride, but can be dissolved in hydrogen fluoride by being used in the form of a double salt or a complex salt.

In the present invention, "double salt or complex salt" means a salt obtained from two or more kinds of salts, and may be either of those which generate the same ions as those in the original salts (double salt) and those which generate ions different from those in the original salts (complex salt).

It is possible to use, as the compound which can form a double salt or complex salt together with the metal fluoride, either or both of a Lewis acidic compound (a compound which accepts an electron pair from the metal fluoride) and a Lewis basic compound (a compound which donates an electron pair to the metal fluoride) according to the metal fluoride. As the Lewis acidic and/or Lewis basic compound, it is preferred to use a Lewis acidic and/or Lewis basic fluoride so as to obtain a higher-purity hydrogen fluoride. However, it is not limited thereto. For example, a Lewis acidic and/or Lewis basic chloride or oxide can be used.

Specifically, the double salt or complex of the metal fluoride comprises, for example, at least one kind selected from the group consisting of $AgFAsF_6$, $AgFSbF_6$, $AgFBiF_6$, $AgFBF_4$, $AgFAuF_6$, $AgFIrF_6$, $AgFRuF_6$, $AgFAuF_4$, $Cs_2KAgF_6$, and the following formulas:

$$A^{II}M^{II}F_4,$$

$$A^{I}M^{III}F_4,$$

$$A^{II}M^{III}F_5,$$

$$A^{I}M^{IV}F_5,$$

$$A^{II}M^{IV}F_6,$$

$$A^{I}M^{V}F_6,$$

and $$A^{II}M^{V}F_7$$

wherein
$A^{I}$=Li, Na, Ag, K, Rb, or Cs,
$A^{II}$=Ca, Sr, Ba, Cd, or Hg,
$M^{II}$=Ag,
$M^{III}$=Ti, V, Cr, Mn, Fe, Co, Ni, Cu, Zr, Mo, Ru, Rh, Pd, Ag, Ir, or Au,
$M^{IV}$=Ti, V, Cr, Mn, Co, Ni, Zr, Nb, Mo, Ru, Rh, Pd, Ag, Cd, Hf, W, Re, Os, Ir, Pt, or Hg, and
$M^{V}$=Nb, Mo, Ru, Rh, Ta, W, Re, Os, Ir, Pt, Au, or Bi (it should be noted that these groups comprise $AgFAsF_6$ and $K_2NiF_6$ which are respectively used in below-mentioned Embodiments 1 and 2, and $K_2MnF_6$, etc.).

As the oxidizing agent of the metal fluoride, these double salts or complexes of metal fluorides may be used alone, or any two or more kinds of them may be used in combination.

The reaction mixture obtained in the step (a) may comprise a reduced metal fluoride derived from the oxidizing agent. It is preferred to utilize this reduced metal fluoride so as to obtain the oxidizing agent of the metal fluoride. Thereby, the metal fluoride can be recycled without forming wastes.

In one embodiment of the present invention, the step (b) can be carried out by the steps of:

(i) bringing the reaction mixture into contact with a Lewis basic fluoride to form a double salt or a complex salt of arsenic pentafluoride and the Lewis basic fluoride, thereby obtaining a contact mixture in which arsenic pentafluoride is immobilized, and (ii) separating a purified hydrogen fluoride from the contact mixture.

Although arsenic pentafluoride may be separated by the distillation or rectification operation as described above, arsenic pentafluoride, according to this embodiment, forms a double salt or complex salt together with a Lewis basic fluoride to be immobilized, so that a higher-purity purified hydrogen fluoride can be obtained simply and easily.

This embodiment can be applied to the cases using some among the aforementioned double salt or complex of the metal fluoride, for example, $AgFAsF_6$, $AgFSbF_6$, $AgFBiF_6$ and the like are used as the oxidizing agent.

In this embodiment, the step (i) may comprise separating a hydrogen fluoride fraction containing arsenic pentafluoride from the reaction mixture and bringing this hydrogen fluoride fraction into contact with a Lewis basic fluoride. As mentioned above, the reaction mixture obtained by the step (a) of the present invention may contain, in addition to hydrogen fluoride, a metal fluoride (an oxidizing agent of a metal fluoride and a reduced metal fluoride derived therefrom) and arsenic pentafluoride. Thus, when the hydrogen fluoride fraction containing arsenic pentafluoride is separated from the reaction mixture, resulting in a state where the metal fluoride is not contained, and then the hydrogen fluoride fraction is brought into contact with the Lewis basic fluoride, the metal fluoride is not mixed in the obtained contact mixture, and therefore it is advantageous to recycle the metal fluoride.

Examples of the Lewis basic fluoride include LiF, NaF, KF, RbF, CsF, AgF, $BeF_2$, $MgF_2$, $SrF_2$, $CaF_2$, $BaF_2$ and the like. Among these Lewis basic fluorides, NaF and KF, which have strong Lewis basicity and are inexpensive, are preferable.

Lewis basic fluorides may be used alone, or any two or more kinds of them may be used in combination.

In another embodiment of the present invention, a double salt or a complex salt of arsenic pentafluoride and the metal fluoride derived from the oxidizing agent is formed in the reaction mixture obtained in the step (a), thereby immobilizing arsenic pentafluoride, and step (b) can be carried out by directly separating a purified hydrogen fluoride from the reaction mixture.

According to the metal fluoride used as the oxidizing agent, arsenic pentafluoride can be immobilized early by forming a double salt or a complex salt together with the metal fluoride in the reaction mixture as in the above, also in this embodiment, a high-purity purified hydrogen fluoride can be obtained simply and easily.

This embodiment can be applied in the cases using some among the aforementioned double salt or complex of the metal fluoride, for example, at least one kind selected from the group consisting of $AgFBF_4$, $AgFAuF_6$, $AgFIrF_6$, $AgFRuF_6$, $AgFAuF_4$, $Cs_2KAgF_6$, and the following formulas:

$$A^{II}M^{II}F_4,$$

$$A^{I}M^{III}F_4,$$

$$A^{II}M^{III}F_5,$$

$$A^{I}M^{IV}F_5,$$

$$A^{II}M^{IV}F_6,$$

$A^I M^V F_6$, and $A^{II} M^V F_7$, wherein
 $A^I$=Li, Na, Ag, K, Rb, or Cs,
 $A^{II}$=Ca, Sr, Ba, Cd, or Hg,
 $M^{II}$=Ag,
 $M^{III}$=Ti, V, Cr, Mn, Fe, Co, Ni, Cu, Zr, Mo, Ru, Rh, Pd, Ag, Ir, or Au,
 $M^{IV}$=Ti, V, Cr, Mn, Co, Ni, Zr, Nb, Mo, Ru, Rh, Pd, Ag, Cd, Hf, W, Re, Os, Ir, Pt, or Hg, and
 $M^V$=Nb, Mo, Ru, Rh, Ta, W, Re, Os, Ir, Pt, Au, or Bi.

In the present invention, "immobilization" comprises the fact that a portion of the product due to complexation may be dissolved, but also comprises that preferably most of the product, more preferably substantially the entire product is in a solid state.

Any of a crude hydrogen fluoride can be used in the purification method of the present invention, as long as it contains arsenic in the form of arsenic trifluoride. It is possible to use the crude hydrogen fluoride of which content of arsenic is, for example, about 10,000 ppm by mass or less, particularly about 3,000 ppm by mass or less and, for example, about 0.1 ppm by mass or more, particularly 3 ppm by mass or more.

The purified hydrogen fluoride obtained by the purification method of the present invention may have any content of arsenic, as long as it is decreased from the original crude hydrogen fluoride. For example, it is possible to decrease to about 10 ppm by mass or less, and preferably about 3 ppm by mass or less, although depending on the content of arsenic of the original crude hydrogen fluoride. In case the content of arsenic of the crude hydrogen fluoride is not so high, the content of arsenic of the obtained purified hydrogen fluoride becomes much lower.

According to another aspect of the present invention, there is also provided a method for producing hydrogen fluoride, which comprises:
 reacting fluorite with sulfuric acid to obtain a crude hydrogen fluoride, and
 subjecting the crude hydrogen fluoride to the aforementioned method for purifying hydrogen fluoride of the present invention to obtain a purified hydrogen fluoride.

According to the method for producing hydrogen fluoride of the present invention, it becomes possible to obtain a high-purity hydrogen fluoride even in a case of using a low-quality fluorite of which content of arsenic is comparatively high.

It is possible to use, as fluorite used in the production method of the present invention, fluorite of which content of arsenic is, for example, about 10,000 ppm by mass or less and, for example, about 0.1 ppm by mass or more, particularly 3 ppm by mass or more.

Advantageous Effects of Invention

According to the present invention, the novel method for purifying hydrogen fluoride is provided. In the method for purifying hydrogen fluoride of the present invention, arsenic trifluoride is oxidized into arsenic pentafluoride by a liquid-liquid reaction using an oxidizing agent of a metal fluoride and then a purified hydrogen fluoride is separated, and thereby allowing an oxidation reaction to proceed quickly, the content of arsenic in hydrogen fluoride can be efficiently decreased.

Also, according to the present invention, the method for producing hydrogen fluoride utilizing the purification method is also provided. According to the method for producing hydrogen fluoride of the present invention, a high-purity hydrogen fluoride can be obtained even in a case of using a low-quality fluorite in which the content of arsenic is comparatively high.

DESCRIPTION OF EMBODIMENTS

Some representative embodiments of the present invention will be described below with reference to the accompanying drawings.

Embodiment 1

The present embodiment relates to an embodiment of a method for purifying hydrogen fluoride in which arsenic pentafluoride generated by an oxidation reaction of arsenic trifluoride is free in the reaction mixture (arsenic pentafluoride is not immobilized as a result of the formation of a double salt or a complex salt with a metal fluoride used as an oxidizing agent).

Figure 1:
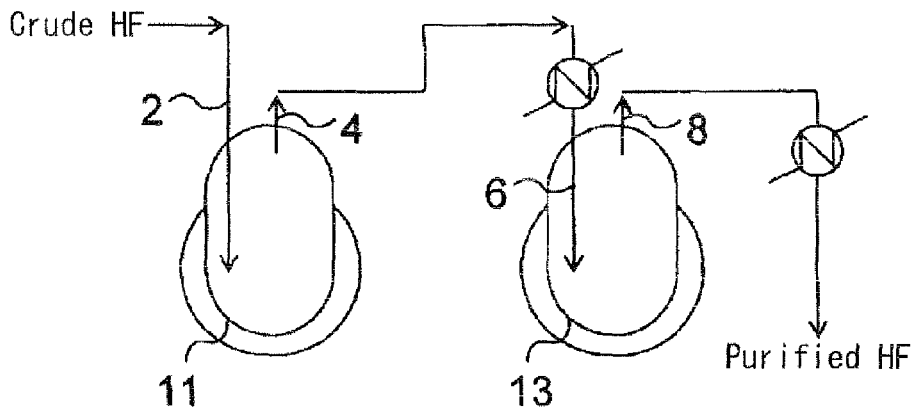
FIG. 1 is a diagram schematically explaining a method for purifying hydrogen fluoride in one embodiment of the present invention.

Referring to FIG. 1, a crude hydrogen fluoride (anhydrous) is supplied in a liquid state to a reactor 11, in which an oxidizing agent of a metal fluoride has been charged in advance, through a line 2, thereby bringing the crude hydrogen fluoride into contact with the oxidizing agent of the metal fluoride in the liquid state.

The crude hydrogen fluoride contains, in addition to HF, arsenic in the form of $AsF_3$. The content of arsenic of the crude hydrogen fluoride may be, for example, about 10,000 ppm by mass or less, particularly about 3,000 ppm by mass or less and, for example, about 0.1 ppm by mass or more, particularly 3 ppm by mass or more. Although the crude hydrogen fluoride may contain other impurities, purity of hydrogen fluoride is, for example, about 99% by mass or more, and preferably 99.9% by mass or more.

In the present embodiment, $AgFAsF_6$ is used as the oxidizing agent of the metal fluoride. $AgFAsF_6$ is excessively charged in the reactor 11 in advance in the form of a HF solution. However, $AgFAsF_6$ per se may be charged in the reactor 11. As below mentioned, $AgFAsF_6$ may be those obtained by regeneration or those prepared from $AgAsF_6$. $AgFAsF_6$ is a complex salt of a metal fluoride $AgF_2$ and a Lewis acidic fluoride $AsF_5$, and is dissolved in HF in a liquid state as a result of the generation of a cation $AgF^+$ and an anion $AsF_6^-$.

In the reactor 11, $AsF_3$ contained in the crude hydrogen fluoride is oxidized by a liquid-liquid reaction with the oxidizing agent $AgFAsF_6$ to form $AsF_5$. Simultaneously, the oxidizing agent $AgFAsF_6$ is reduced into $AgAsF_6$.

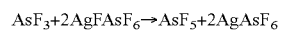

This oxidation reaction can be carried out, for example, under about 0.01 to 1 MPa at about 0 to 30° C.

While not intending to limit the present invention, it is practical to apply a minutely reduced pressure (for example, about 0.09 MPa) so as to reduce costs required for power such as a pump while preventing the risk of HF leak. Since the oxidation reaction can proceed at room temperature, it is practical to apply a temperate which is minutely lower than a boiling point of HF under the pressure, so as to reduce costs required for the subsequent distillation step and cooling.

The reaction mixture obtained in the reactor 11 includes HF, $AsF_5$, by-produced $AgAsF_6$ and the unreacted $AgFAsF_6$.

The objective HF is separated as a hydrogen fluoride fraction in a vapor phase state, for example, by distillation through heating of the reactor 11, and then taken out of the reactor 11 through a line 4.

$AsF_5$ is contained in the hydrogen fluoride fraction.

On the other hand, since the metal fluoride generally has little vapor pressure, $AgAsF_6$ and $AgFAsF_6$ remain in the reactor 11 without being taken out as a vapor.

The hydrogen fluoride fraction (HF and $AsF_5$) taken out of the reactor 11 in a vapor phase state is transferred to a separator 13, in which a Lewis basic fluoride has been charged in advance, in a liquid state through a line 6 via a condenser, thereby bringing the hydrogen fluoride fraction into contact with the Lewis basic fluoride.

In the present embodiment, NaF is used as the Lewis basic fluoride. NaF is excessively charged (or filled) in the separator 13 in a solid state, for example, as particles in advance. While not intending to limit the present embodiment, since HF exists in a comparatively large amount, NaF can be dissolved in HF.

In the separator 13, $AsF_5$ contained in the hydrogen fluoride fraction is complexed with NaF to form $NaAsF_6$ in a solid state.

$$AsF_5 + NaF \rightarrow NaAsF_6$$

This complexation is, for example, carried out under about 0.01 to 1 MPa at about 0 to 30° C.

The contact mixture obtained in the separator 13 includes HF, $NaAsF_6$ and the unreacted NaF, and $AsF_5$ is immobilized as $NaAsF_6$ in this contact mixture.

The objective HF is separated as a purified hydrogen fluoride in a vapor form, for example, by distillation through heating of the separator 13, and then taken out of the separator 13 through a line 8.

On the other hand, $NaAsF_6$ and the unreacted NaF remain in the separator 13 in a solid state.

In this way, the purified hydrogen fluoride is obtained, if necessary in a liquid state via the condenser. The obtained purified hydrogen fluoride has a decreased content of arsenic and, for example, it is possible to decrease to about 3 ppm by mass or less, and preferably about 1 ppm by mass or less.

In the method for purifying hydrogen fluoride of the present embodiment, the reaction rate is high since the oxidation reaction in the reactor 11 can be carried out by a liquid-liquid reaction. Therefore, supply of the crude hydrogen fluoride to the reactor 11 and taking of the hydrogen fluoride fraction from the reactor 11 can be continuously carried out. Furthermore, when supply to the immobilizing separator 13 and taking of the purified hydrogen fluoride from the immobilizing separator 13 are also continuously carried out, the entire process for purification of hydrogen fluoride can be continuously carried out.

$AgAsF_6$ formed as the by-product by the oxidation reaction in the reactor 11 can be reacted with a $F_2$ gas to regenerate $AgFAsF_6$.

$$2AgAsF_6 + F_2 \rightarrow 2AgFAsF_6$$

Such regeneration can be carried out, for example, charging a solid $AgAsF_6$ in HF, supplying an $F_2$ gas thereto (the $F_2$ gas may be diluted, if appropriate, and the $F_2$ gas can be supplied by bubbling or the like, the same shall apply in the present description unless otherwise specified), and causing the aforementioned reaction.

The aforementioned regeneration in the present embodiment has an advantage that it is easy to carry out the regeneration continuously since the regeneration proceeds only by reacting it with the $F_2$ gas.

The regenerated $AgFAsF_6$ can be used again as the oxidizing agent. Therefore, according to the present embodiment, wastes are not generated.

When $NaAsF_6$ formed by complexation in the separator 13 is placed in water, it is decomposed into NaF, $H_2AsO_4$ and HF. NaF can be recycled as the Lewis basic fluoride so as to immobilize $AsF_5$.

Many modifications are possible in the present embodiment. For example, referring to FIG. 2, a method for purifying hydrogen fluoride can be carried out using reactors 11 and 11', and separators 13 and 13', each being arranged in parallel. More specifically, this modification can be carried out by the following procedure.

Using the reactor 11 and the separator 13 for purifying hydrogen fluoride as mentioned above, while the reactor 11' and the separator 13' are disconnected from the line of purification of hydrogen fluoride (using a valve (not shown), the same shall apply hereinafter).

As the oxidizing agent $AgFAsF_6$ is consumed by the oxidation reaction in the reactor 11, the reactor 11 is switched to another reactor 11' and a crude hydrogen fluoride is supplied to the reactor 11' through a line 2', and then a hydrogen fluoride fraction is extracted from the reactor 11' through a line 4'. While the oxidation reaction is carried out in the reactor 11', an $F_2$ gas is supplied to the reactor 11 through a line 5 and regeneration of the oxidizing agent is carried out. In this way, the oxidation reaction and the regeneration of the oxidizing agent are carried out by alternately switching in the reactors 11 and 11'.

As NaF is consumed by the complexation in the separator 13, the separator 13 is switched to another separator 13' and a hydrogen fluoride fraction is supplied to the separator 13' through a line 6', and then a purified hydrogen fluoride is taken out of the separator 13' through a line 8'. While the complexation is carried out in the separator 13', NaF is exchanged by taking out a solid phase of $NaAsF_6$ (and the unreacted NaF) from the separator 13 and filling fresh NaF. In this way, the complexation (immobilization) and the exchange of NaF are carried out by alternately switching in the separators 13 and 13'.

Switching of the reactors 11 and 11' and switching of the separators 13 and 13' may be carried out at the same or different timing.

According to such modification, purification of hydrogen fluoride can be continuously carried out without being stopped.

Alternately, the oxidizing agent may be prepared in place of the regeneration of the oxidizing agent.

The oxidizing agent can be prepared by, for example, firstly charging AgF in HF, supplying an $F_2$ gas thereto to cause the following reactions:

$$2AgF + F_2 \rightarrow 2AgF_2$$

$$2AgF_2 + AsF_3 \rightarrow 2AgF + AsF_5$$

$$AgF + AsF_5 \rightarrow AgAsF_6$$

($AsF_3$ exists as impurities) and thus obtain $AgAsF_6$, supplying an $F_2$ gas thereto to cause the aforementioned reaction with respect to the regeneration of the oxidizing agent.

According to the present embodiment and the modifications thereof, the regeneration or preparation of the oxidizing agent can be easily carried out. This is an advantage that can be obtained in case of using an Ag-based fluoride as the oxidizing agent.

Figure 3:
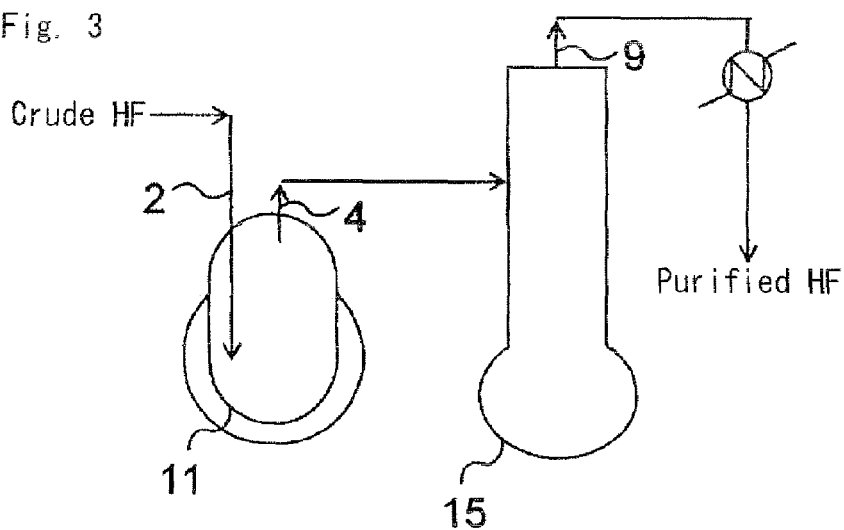
FIG. 3 is a diagram schematically explaining another modification of the embodiment of FIG. 1.

In another modification, referring to FIG. 3, a purified hydrogen fluoride can also be obtained by supplying the hydrogen fluoride fraction obtained by the reactor 11 to a distillation column 15, and subjecting to a rectification operation. As mentioned above, the hydrogen fluoride fraction includes HF and $AsF_5$ in a vapor phase. However, in a liquid phase, $AsF_5$ can form complex salts such as $H_2FAsF_6$ and/or $H_2FAs_2F_{11}$ with HF. Since these complex salts have a higher boiling point than that of arsenic trifluoride, they can be separated by the rectification operation. The purified hydrogen fluoride is taken out as a low-boiling point component from the column top side of the distillation column 15 through a line 9.

As to these complex salts, dissociation equilibrium exists and those in an ionic state are dissolved in HF (and therefore entrained in the purified hydrogen fluoride).

$$H_2FAsF_6 \rightarrow H_2F^+ + AsF_6^-$$

$$H_2FAs_2F_{11} \rightarrow H_2F^+ + As_2F_{11}^-$$

Figure 2:
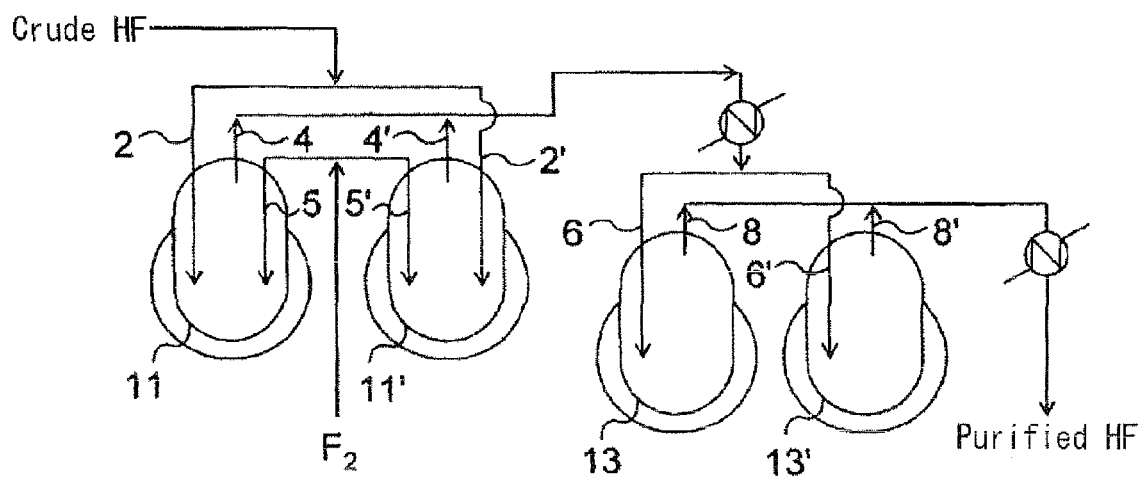
FIG. 2 is a diagram schematically explaining modification of the embodiment of FIG. 1.

Therefore, in order to obtain a higher-purity purified hydrogen fluoride, $AsF_5$ is preferably separated and removed by immobilization, as shown in FIG. 1 or 2.

Embodiment 2

The present embodiment relates to an embodiment of a method for purifying hydrogen fluoride in which arsenic pentafluoride generated by an oxidation reaction of arsenic trifluoride is immobilized in the reaction mixture (arsenic pentafluoride is immobilized as a result of the formation of a double salt or a complex salt with a metal fluoride used as an oxidizing agent). Unless otherwise explained, the aforementioned description in Embodiment 1 is also applied to the present embodiment.

Figure 4:
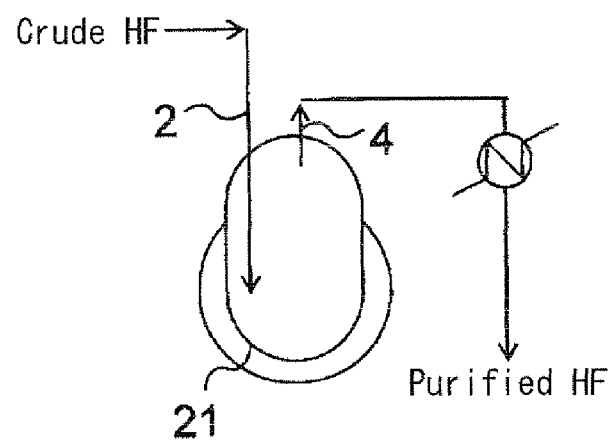
FIG. 4 is a diagram schematically explaining a method for purifying hydrogen fluoride in another embodiment of the present invention.

Referring to FIG. 4, a crude hydrogen fluoride (anhydrous) is supplied to a reactor 21, in which an oxidizing agent of a metal fluoride has been charged in advance, in a liquid state through a line 2, thereby bringing the crude hydrogen fluoride into contact with the oxidizing agent of the metal fluoride in the liquid state.

In the present embodiment, $K_2NiF_6$ is used as the oxidizing agent of the metal fluoride. $K_2NiF_6$ is excessively charged in the reactor 21 in advance in the form of a HF solution. $K_2NiF_6$ is a complex salt of a metal fluoride $NiF_4$ and a Lewis basic fluoride KF, and dissolved in HF in a liquid state as a result of the generation of a cation $K^+$ and an anion $NiF_6^{2-}$.

In the reactor 21, $AsF_3$ contained in the crude hydrogen fluoride is oxidized by a liquid-liquid reaction with the oxidizing agent $K_2NiF_6$ to form $AsF_5$. Simultaneously, the oxidizing agent $K_2NiF_6$ is reduced into $NiF_2$ and also KF is formed.

$$AsF_3 + K_2NiF_6 \rightarrow AsF_5 + NiF_2 + 2KF$$

Furthermore, in the reactor 21, KF freed by the oxidation reaction is complexed with $AsF_5$ to form $KAsF_6$ in a solid state. At this time, $KAsF_6$ is deposited (or precipitated).

$$AsF_5 + KF \rightarrow KAsF_6$$

KF is consumed by the aforementioned reaction, or deposited (or precipitated) as $KNiF_3$ and/or $K_2NiF_4$.

This oxidation reaction and complexation can be, for example, carried out under about 0.01 to 1 MPa at about 0 to 30° C.

The reaction mixture obtained in the reactor 21 includes HF, the unreacted $K_2NiF_6$, by-produced $NiF_2$, $KNiF_3$ and/or $K_2NiF_4$, and $KAsF_6$, and $AsF_5$ is immobilized as $KAsF_6$ in this reaction mixture.

The objective HF is separated as a purified hydrogen fluoride in a vapor phase, for example, by distillation through heating of the reactor 21, and then taken out of the reactor 21 through a line 4.

On the other hand, since the metal fluoride generally has little vapor pressure, $K_2NiF_6$ and $NiF_2$, $KNiF_3$ and/or $K_2NiF_4$, and deposited $KAsF_6$ remain in the reactor 21 without being taken out as a vapor. Therefore, the reactor 21 in the present embodiment is also a separator.

In this way, the purified hydrogen fluoride is obtained, if necessary in a liquid state via a condenser.

In the method for purifying hydrogen fluoride of the present embodiment, the reaction rate is high since the oxidation reaction in the reactor 21 can be carried out by a liquid-liquid reaction, and the separation can be quickly carried out in the reactor 21. Therefore, supply of the crude hydrogen fluoride to the reactor 21 and taking of the purified hydrogen fluoride from the reactor 21, namely, the entire process for purification of hydrogen fluoride can be continuously carried out.

$NiF_2$ formed as the by-product by the oxidation reaction in the reactor 21 can be converted into $NiCl_2$ and then reacted with an $F_2$ gas together with KCl to regenerate $K_2NiF_6$.

$$NiCl_2 + 2KCl + 3F_2 \rightarrow K_2NiF_6 + 2Cl_2$$

The regenerated $K_2NiF_6$ can be used again as the oxidizing agent. Therefore, according to the present embodiment, wastes are not generated.

The deposited $KAsF_6$ is also contained in the residue in the reactor 21. The deposited $KAsF_6$ can be easily separated from $NiF_2$ and the unreacted $K_2NiF_6$ by a solid-liquid separation.

When $KAsF_6$ formed by complexation in the separator 21 is placed in water, it is decomposed into KF, $H_2AsO_4$ and HF. KF can be recycled as the Lewis basic fluoride so as to obtain an oxidizing agent $K_2NiF_6$ (and to immobilize $AsF_5$).

According to the present embodiment, the oxidation reaction and immobilization due to complexation can be integrally carried out, without a separate step of bringing into contact with the Lewis basic fluoride as in Embodiment 1.

Embodiment 3

The present embodiment relates to a method for producing hydrogen fluoride.

In the present embodiment, used as fluorite is a so-called low-quality fluorite, which is fluorite containing impurities such as silicon dioxide ($SiO_2$), calcium carbonate ($CaCO_3$) and arsenic (As) and having a content of arsenic of about 1,000 to 3 ppm by mass.

First, this fluorite and sulfuric acid are separately supplied to a prereactor and the obtained mixture is then transferred to a rotary kiln. In the prereactor and the rotary kiln, the fluorite is reacted with sulfuric acid under heating to form hydrogen fluoride ($CaF_2 + H_2SO_4 \rightarrow 2HF\uparrow + CaSO_4$).

A portion of sulfuric acid to be supplied may be fuming sulfuric acid, thereby enabling fuming sulfuric acid to absorb water, which may be minutely formed, resulting in suppression of corrosion of the prereactor, the rotary kiln and so on.

The reaction conditions (temperature, pressure and the like) can be appropriately selected, but may be in, for example, about 100 to 300° C. and about 0.05 to 0.2 MPa.

The hydrogen fluoride (HF) thus formed is taken out from the vicinity of an upper inlet of the rotary kiln in the form of a gaseous substance containing HF. This gaseous substance can contain, in addition to HF, $SiF_4$, $CO_2$, $AsF_3$ and so on which are formed and derived from impurities of the fluorite. Gypsum ($CaSO_4$) as the by-product and so on are taken out from a lower outlet of the rotary kiln.

The obtained gaseous substance is converted into a liquid substance by cooling and transferred to a distillation column, where the liquid substance is subjected to a distillation operation. There is no particular limitation on the number of distillation columns, operation method and the like, and any proper operation can be carried out.

By this distillation operation, $SiF_4$ and $CO_2$ are separated to obtain a crude hydrogen fluoride including HF and $AsF_3$.

The obtained crude hydrogen fluoride is subjected to the aforementioned purification method in Embodiment 1 (including modifications) and Embodiment 2 to obtain a purified hydrogen fluoride.

Examples

Method for Quantitative Determination of Arsenic

In the following Examples, a sample was prepared in accordance with JIS K8819 and the content of arsenic was measured by subjecting the obtained sample to ICP analysis. Specific procedure is as follows.

After taking 50 g of a sample (specimen) in a platinum dish, 4 ml of nitric acid (1+1), 5 ml of saturated bromine water and 5 ml of sulfuric acid (1+9) are added thereto, and then the resultant in the dish is subjected to evaporation on a water bath until the residual volume becomes about 0.5 ml. An inner wall of the dish for evaporation is washed with a small amount of water, and the resultant in the dish is subjected to evaporation again on the water bath until the residual volume becomes about 0.5 ml, and then water is added thereto to make it into 20 ml.

The obtained sample is analyzed by using an ICP optical emission spectrometer SPS3000 (m Seiko Instruments Inc.) to determine its content (concentration) of arsenic.

Example 1

The present Example is an example of Embodiment 1. In the following description, "distillation" refers to an operation of transferring a substance from one system (pre-distillation) at room temperature to other system (post-deposition) cooled at −30 to −196° C.

Preparation of Crude Hydrogen Fluoride

Synthesized $AsF_3$ (trace amount) was introduced by distillation into a T-shaped reaction vessel (having a volume of about 20 ml) made of PFA (polytetrafluoroethylene perfluorovinyl ether copolymer) and connected to a vacuum line made of stainless steel, and a commercially available anhydrous hydrogen fluoride (4 ml) was introduced thereon by distillation. After mixing the both by thoroughly stirring at room temperature, a half of the anhydrous hydrogen fluoride containing $AsF_3$ was poured into branch pipe and this was separated as a sample before treatment (crude hydrogen fluoride containing $AsF_3$).

Purification of Hydrogen Fluoride

The remaining half (crude hydrogen fluoride containing $AsF_3$) was introduced by distillation into a vessel made of PFA which contains $AgFAsF_6$ (100 mg), followed by stirring it at room temperature for 5 minutes. The obtained mixture was distilled to separate a portion thereof as a sample after pretreatment and to introduce the remaining mixture into another vessel made of PFA which contains NaF (109 mg), followed by stirring it at room temperature for 10 minutes. The obtained mixture was distilled to transfer a portion thereof into another vessel made of PFA, as a sample after treatment.

Results

Each sample (2 ml) thus obtained was weighed and diluted with distilled water to obtain 50 ml of an aqueous solution, and then the content of arsenic was determined. Results showed that the content of arsenic was 464 ppm in the sample before treatment, and that the content of arsenic was 2 ppm or less in the sample after treatment. In the sample after pretreatment, the content of arsenic was about 5 ppm.

Example 2

The present Example is an example of Embodiment 2.

Preparation of Crude Hydrogen Fluoride

The same operation as in the preparation of the crude hydrogen fluoride in Example 1 was carried out.

Purification of Hydrogen Fluoride

The remaining half (crude hydrogen fluoride containing $AsF_3$) was introduced by distillation into a vessel made of PFA which contains $K_2NiF_6$ (128 mg), followed by stirring it at room temperature for 5 minutes. The obtained mixture was distilled to transfer a portion thereof into another vessel made of PFA, as a sample after treatment.

Results

The content of arsenic of each sample thus obtained was determined in the same manner as in Example 1. Results showed that the content of arsenic was 489 ppm in the sample before treatment, and that the content of arsenic was 2 ppm or less in the sample after treatment.

Example 3

The present Example is an example of Embodiment 3.

Preparation of Crude Hydrogen Fluoride

Fluorite produced in Mexico (30 g) and concentrated sulfuric acid (98%, 40 g) were mixed in a vessel (having a volume of about 100 ml) made of PFA, and the mixture was heated to 110° C., and the generated vapor thereby was collected under vacuum at a liquid nitrogen temperature. The obtained mixture was distilled to transfer a first fraction (70%) thereof to another vessel made of PFA which contains concentrated sulfuric acid (50 g), followed by dehydration while stirring it at room temperature for 30 minutes. The obtained mixture was distilled to separate a fraction of an anhydrous hydrogen fluoride from concentrated sulfuric acid and transfer the fraction to another vessel made of PFA. The obtained fraction of anhydrous hydrogen fluoride was distilled again to obtain a first fraction (70%) thereof as a crude hydrogen fluoride. In this way, the crude hydrogen fluoride (about 4 ml) was obtained, and a half thereof was separated as a sample before treatment (crude hydrogen fluoride containing $AsF_3$).

Purification of Hydrogen Fluoride

Using the remaining half (crude hydrogen fluoride containing $AsF_3$), the same operation as in the purification of hydrogen fluoride in Example 1 was carried out, except for using $AgFAsF_6$ (100 mg) and NaF (100 mg).

Results

The content of arsenic of each sample thus obtained was determined in the same manner as in Example 1. Results showed that the content of arsenic was 515 ppm in the sample before treatment, and that the content of arsenic was 3 ppm or less in the sample after treatment.

INDUSTRIAL APPLICABILITY

Even when a fluorite ore containing a large amount of arsenic is used as a raw material, it is possible to obtain a high-purity hydrogen fluoride of which amount of arsenic is as less as that in the case of using a conventional high-purity fluorite as a raw material, at low cost.

Even when a low-quality fluorite containing arsenic is used, it is possible to industrially purify or obtain a high-purity hydrogen fluoride, and thus utilization of a fluorine resource can be enlarged.

REFERENCE SIGNS LIST 2, 2', 4, 4', 5, 5', 6, 6', 8, 8', 9 Line
11, 11' Reactor
13, 13' Separator
15 Distillation column
21 Reactor (which concurrently serves as Separator)

The invention claimed is:

1. A method for purifying hydrogen fluoride, which comprises the steps of:
   (a) bringing a crude hydrogen fluoride containing arsenic trifluoride into contact with an oxidizing agent of a metal fluoride in a liquid state to obtain a reaction mixture wherein arsenic pentafluoride is formed by oxidizing arsenic trifluoride with the oxidizing agent of the metal fluoride through a liquid-liquid reaction, wherein the oxidizing agent of the metal fluoride is used in the form of a double salt or a complex salt of the metal fluoride, and
   (b) separating purified hydrogen fluoride from the reaction mixture, the thus obtained purified hydrogen fluoride having a lower content of arsenic than that of the crude hydrogen fluoride.

2. The method according to claim 1, wherein the double salt or complex salt of the metal fluoride comprises at least one kind selected from the group consisting of $AgFAsF_6$, $AgFSbF_6$, $AgFBiF_6$, $AgFBF_4$, $AgFAuF_6$, $AgFIrF_6$, $AgFRuF_6$, $AgFAuF_4$, $Cs_2KAgF_6$, and the following formulas:

$A^{II}M^{II}F_4$, $A^{I}M^{III}F_4$, $A^{II}M^{III}F_5$, $A^{I}M^{IV}F_5$, $A^{II}M^{IV}F_6$, $A^{I}M^{V}F_6$, and $A^{II}M^{V}F_7$ wherein
$A^{I}$=Li, Na, Ag, K, Rb, or Cs
$A^{II}$=Ca, Sr, Ba, Cd, or Hg
$M^{II}$=Ag,
$M^{III}$=Ti, V, Cr, Mn, Fe, Co, Ni, Cu, Zr, Mo, Ru, Rh, Pd, Ag, Ir, or Au,
$M^{IV}$=Ti, V, Cr, Mn, Co, Ni, Zr, Nb, Mo, Ru, Rh, Pd, Ag, Cd, Hf, W, Re, Os, Ir, Pt, or Hg, and
$M^{V}$=Nb, Mo, Ru, Rh, Ta, W, Re, Os, Ir, Pt, Au, or Bi.

3. The method according to claim 1, wherein the reaction mixture obtained in the step (a) comprises a reduced metal fluoride derived from the oxidizing agent, and the reduced metal fluoride is utilized so as to obtain the oxidizing agent of the metal fluoride.

4. The method according to claim 1, wherein the step (b) is carried out by the steps of:
   (i) bringing the reaction mixture into contact with a Lewis basic fluoride to form a double salt or a complex salt of arsenic pentafluoride and the Lewis basic fluoride, thereby obtaining a contact mixture in which arsenic pentafluoride is immobilized, and
   (ii) separating a purified hydrogen fluoride from the contact mixture.

5. The method according to claim 4, wherein the step (i) comprises separating a hydrogen fluoride fraction containing arsenic pentafluoride from the reaction mixture, and bringing the hydrogen fluoride fraction into contact with the Lewis basic fluoride.

6. The method according to claim 4, wherein the Lewis basic fluoride contains at least one kind selected from the group consisting of LiF, NaF, KF, RbF, CsF, AgF, $BeF_2$, $MgF_2$, $SrF_2$, $CaF_2$, and $BaF_2$.

7. The method according to claim 1, wherein a double salt or a complex salt of arsenic pentafluoride and the metal fluoride derived from the oxidizing agent is formed in the reaction mixture obtained in the step (a), thereby immobilizing arsenic pentafluoride, and
   step (b) is carried out by directly separating a purified hydrogen fluoride from the reaction mixture.

8. The method according to claim 1, wherein the content of arsenic of the crude hydrogen fluoride is from 3,000 to 3 ppm by mass.

9. The method according to claim 1, wherein the content of arsenic of the purified hydrogen fluoride is 3 ppm by mass or less.

10. A method for producing hydrogen fluoride, which comprises:
    reacting fluorite with sulfuric acid to obtain a crude hydrogen fluoride, and
    subjecting the crude hydrogen fluoride to the purification method according to claim 1 to obtain a purified hydrogen fluoride.

11. The method according to claim 10, wherein the content of arsenic of fluorite is from 10,000 to 3 ppm by mass.

12. The method according to claim 1, wherein the oxidizing agent of the metal fluoride is at least one selected from the group consisting of (i) a complex salt of $AgF_2$ and a Lewis acidic fluoride and (ii) a complex salt of $NiF_4$ or $MnF_4$ and a Lewis basic fluoride.

13. The method according to claim 10, wherein the oxidizing agent of the metal fluoride is at least one selected from the group consisting of (i) a complex salt of $AgF_2$ and a Lewis acidic fluoride and (ii) a complex salt of $NiF_4$ or $MnF_4$ and a Lewis basic fluoride.

* * * * *